Aug. 17, 1926.
T. MORINELLI
1,596,445
SHOCK ABSORBER
Filed April 13, 1926    2 Sheets-Sheet 1
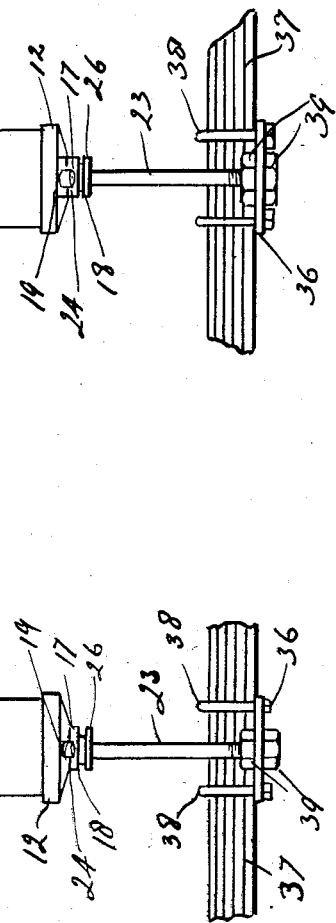
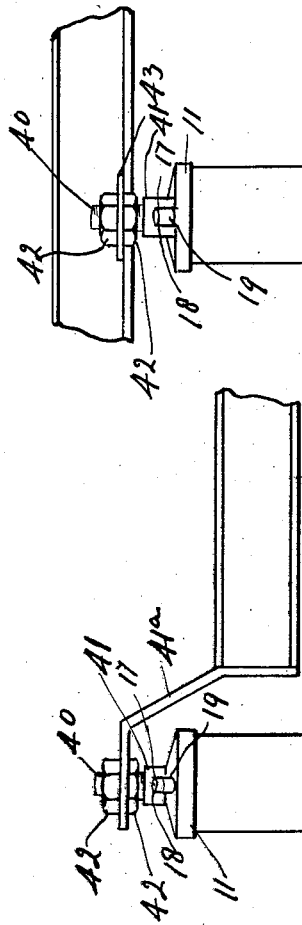
INVENTOR
Thomas Morinelli
By W. W. Williamson Atty.

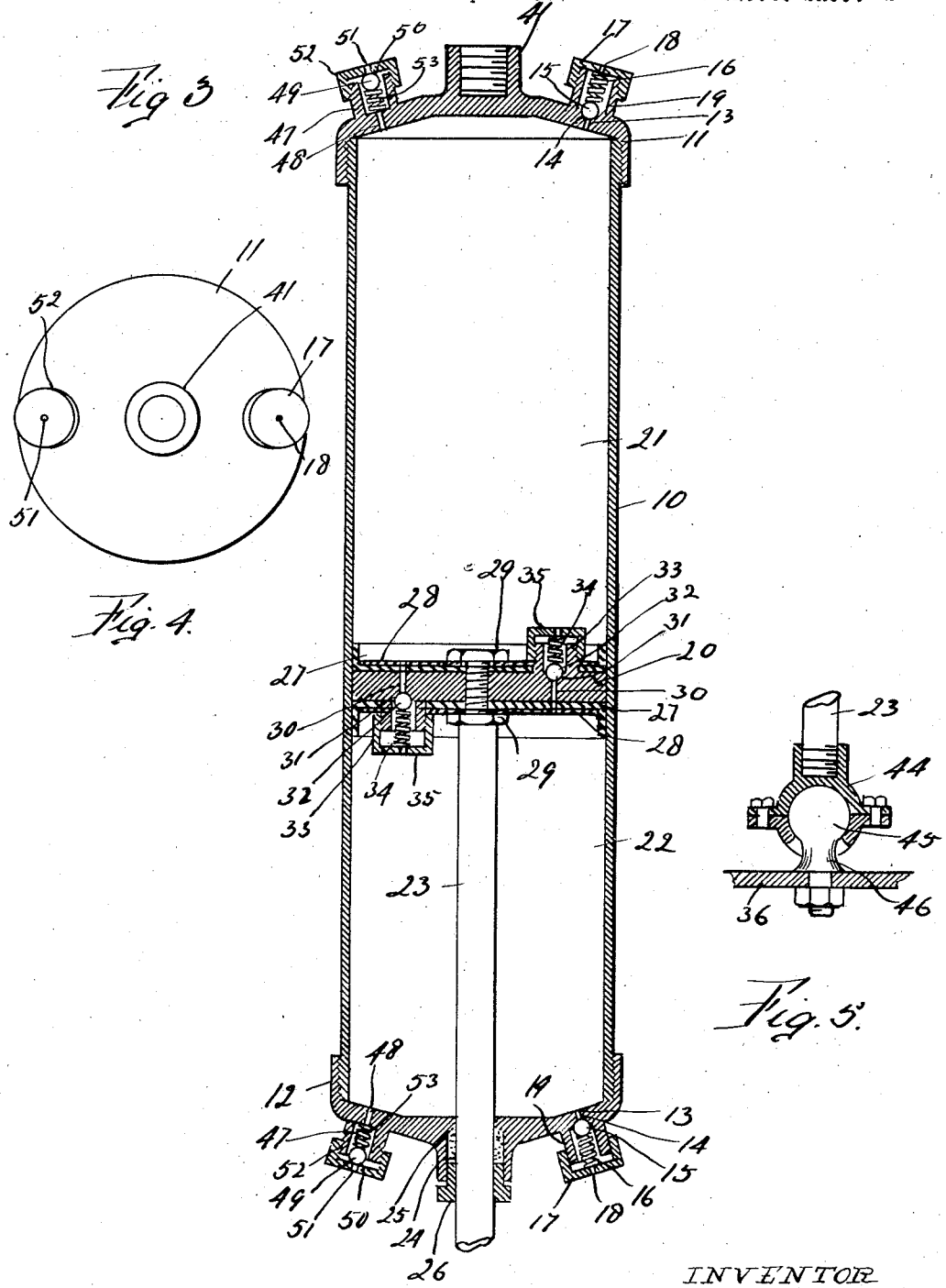

Patented Aug. 17, 1926.

1,596,445

REISSUED

UNITED STATES PATENT OFFICE.

THOMAS MORINELLI, OF PHILADELPHIA, PENNSYLVANIA.

SHOCK ABSORBER.

Application filed April 13, 1926. Serial No. 101,681.

My invention relates to new and useful improvements in a shock absorber, which is primarily adapted for use in connection with vehicles in order to absorb the shock incident to travel over a roadway, and thereby prevent the transmission of the shocks to the vehicle body, but, of course, it is to understood that I do not limit the use of the device for this particular feature.

Another object of the invention is to provide a shock absorber including a cylinder divided into chambers by a piston slidable within the cylinder, the former having a pair of opposed valve controlled passageways to permit the transfer of air from one chamber to the other, while the cylinder is provided with one or more valve controlled air passageways at each end thereof, one of which permits the egress of air from the cylinder, while the other, when used, permits ingress of air.

A further object of the invention is to provide an exceedingly simple, effective and inexpensive shock absorber, which will be strong, durable and efficient in operation.

A still further object of the invention is to provide means for attaching the shock absorber to a vehicle and to provide means for allowing a certain sidewise movement of the parts when used.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1 illustrates one method of attaching one of the shock absorbers to the front of an automobile of a certain type.

Fig. 2 illustrates the method of fastening a shock absorber to the rear of an automobile.

Fig. 3 is an enlarged vertical sectional view of the shock absorber.

Fig. 4 is a plan view thereof; and

Fig. 5 is a sectional view of a ball and socket joint, which will permit universal movement of the shock absorber relative to the part to which it is attached.

In carrying out my invention as herein embodied, 10 represents the cylindrical body of the shock absorber, having a head 11 at one end and another head 12 at the other end, and these heads may be mounted on the body in any suitable or well-known manner as by threading, brazing, welding or the like. From each head leads an outlet passageway 13 with which is associated the valve seat 14 for the reception of a valve 15 normally held against its seat by the spring 16, one end of which rests against the valve 15 as the movable element and the other end against a cap 17 as the stationary element. The cap 17 is provided with an aperture 18 for the passageway of air and is threaded or otherwise suitably adjustably mounted upon the valve casing 19, whereby the tension of the spring may be varied, and it is to be understood that the cap may be held in its adjusted position after the spring has been properly tensioned.

Within the body of the device is slidably mounted a piston 20 which divides the interior of said body into two chambers 21 and 22, and said piston has a piston rod 23 connected therewith passing through one of the heads of the shock absorber, and this head is provided with a stuffing box 24 to hold a suitable packing 25 compressed by the gland 26.

On both faces of the piston are mounted the cup washers 27 which are held in place by the metal washers 28, the latter being secured by the nuts 29 on the piston rod. A pair of air passageways 30 are provided in the piston, and each has a valve seat 31 associated with one end, the valve seat of one passageway being opposed to that of the other, while with each seat coacts a valve 32 located within a valve casing 33, and normally held on its seat by a spring 34 enclosed by a cap 35, which may also be utilized for tensioning the spring because of its threaded connection with the valve casing.

The piston rod 23 has its outer end threaded and is passed through a suitable bracket 36 fastened to a vehicle spring 37 by means of suitable U bolts 38 or their equivalent, it being understood that a portion of the bracket extends beyond the sides of the spring a sufficient distance to accommodate the nuts 39 having threaded connection with the piston rod. To connect the shock absorber with the body of the vehicle, the head 11 has a short rod 40 mounted thereon and, if found desirable, said head may be provided with an internally threaded socket 41 to receive said short rod which, in the case of the forward shock absorber, passes through a portion of the bracket arm 41ª, as shown in Fig. 1, and has suitable nuts 42 threaded thereon to engage the bracket arm. While in the case of the rear shock absorber, as illustrated in Fig. 2, a short rod 40 passes through a bracket plate 43 which extends from the side of the frame or chassis, and it is to be understood that the bracket arm 41ª is also secured to the side rail of the chassis.

In most cases the construction above described and the method of mounting the shock absorbers is the preferred one, but under some conditions, it is advisable to make a less rigid connection between the several parts, and to this end I may provide a ball and socket joint or other equivalent connection, but for convenience of illustration, I have shown a socket 44 as connected with the shock absorber, either to the piston rod 23 or the short rod 40, while the ball 45 is provided with a shank 46 by which it may be attached to any one of the brackets above mentioned. Such an arrangement will permit the usual swinging of the body of the automobile relative to the chassis.

In actual practice, it has been found that when the springs of the several valves have been properly tensioned, the movement of the body downward will be slow and easy, while the rebound may be slightly faster, but any movement of the body upward beyond its normal position will be quickly checked so that said body during a majority of the time is in its natural position. When the shock absorber is working the movements of the piston cause the air in one chamber to flow through a passageway in the piston to the other chamber, and in case of some extra large obstruction in the roadway, the piston moves a greater distance than ordinarily so that the air in the chamber becomes quickly compressed, the excess air may be expelled through one of the outlet valves at an end of the shock absorber.

If it is found desirable that the air in the shock absorber should be replenished, this may be accomplished automatically by placing another valve casing 47 at each end of the device and associated with an air inlet passageway 48 in which case the valve 49 engages a seat 50 about the inlet 51 in the cap 52 and said valve is held against its seat by the spring 53, the tension of which may be varied by threading the cap 52 in or out, as will be obvious.

When using the inlet valves should the air in the shock absorber tend to reduce below a predetermined pressure, additional air may enter through the inlets in order to maintain the proper pressure in the shock absorber.

Of course I do not wish to be limited to the exact details of construction as herein shown as these may be varied within the limits of the appended claims without departing from the spirit of my invention.

Having thus fully described my invention, what I claim as new and useful is:

1. A shock absorber including a cylindrical receptacle closed at both ends, outlet passageways leading through the closed ends, spring actuated valves controlling said passageways, a piston slidably mounted within the receptacle and having air passageways therethrough, a spring actuated valve controlling each passageway, the valve of one passageway being opposed to the other, and a piston rod attached to the piston and passing through one of the closed ends of the receptacle.

2. A shock absorber including a body, a head at each end of said body, a socket formed with one of said heads, a short rod mounted in the socket for attachment to a bracket on a valve, a stuffing box carried by the other head, a piston slidably mounted within the body and having air passageways therethrough, a spring actuated valve controlling each passageway, the valve of one passageway being opposed to the other, a piston rod connected with a piston and passing through the stuffing box, said piston rod being connected to a suitable bracket attached to the running gear of the vehicle, an outlet passageway in each head and a spring actuated valve to control said outlet passageways.

3. The structure set forth in claim 2 wherein the short rod and the piston rod are provided with flexible connections.

4. A shock absorber including a receptacle having closed ends, an outlet passageway at each end, a spring actuated valve controlling each passageway, an outlet passageway at each end, a spring actuated valve controlling each of the outlet passageways, a piston within the receptacle and provided with two air passageways, a spring actuated valve controlling each passageway with the valve of one passageway opposed to that of the other, a piston rod connected with the piston and passing through one of the closed ends for connection with a portion of a vehicle and means at the other closed end to permit connection with another portion of a vehicle.

5. The structure set forth in claim 4 wherein the piston has a pair of opposed cup washers on opposite faces, metal washers within said cup washers and engaged by the means which holds the piston rod on the piston for fastening all the parts together.

In testimony whereof, I have hereunto affixed my signature.

THOMAS MORINELLI.